United States Patent [19]

Sakamoto et al.

[11] Patent Number: 4,956,593
[45] Date of Patent: Sep. 11, 1990

[54] SERVO MOTOR CONTROLLING METHOD

[75] Inventors: Keiji Sakamoto, Hachioji; Shinji Seki, Kokubunji; Yasusuke Iwashita, Minamitsuru, all of Japan

[73] Assignee: Fanuc Ltd., Minamitsuru, Japan

[21] Appl. No.: 368,291

[22] PCT Filed: Sep. 22, 1988

[86] PCT No.: PCT/JP88/00978
§ 371 Date: May 24, 1989
§ 102(e) Date: May 24, 1989

[87] PCT Pub. No.: WO89/03611
PCT Pub. Date: Apr. 20, 1989

[30] Foreign Application Priority Data

Oct. 14, 1987 [JP] Japan .................. 62-259333

[51] Int. Cl.$^5$ .............................. G05B 13/00
[52] U.S. Cl. ...................... 318/561; 318/609; 318/610; 318/721; 318/568.22
[58] Field of Search ............ 318/561, 609, 610, 721, 318/568.22

[56] References Cited

U.S. PATENT DOCUMENTS 4,573,002 2/1986 Kurakake ..................... 318/721
4,733,149 3/1988 Culberson .................... 318/561
4,873,476 10/1989 Kurakake ................ 318/568.22

Primary Examiner—William M. Shoop, Jr.
Assistant Examiner—Saul M. Bergmann
Attorney, Agent, or Firm—Staas & Halsey

[57] ABSTRACT

A servo motor controlling method for controlling both speed and current of a servo motor under digital control. An integration gain unit (22) and a loop proportional gain unit (26) of the current controlling loop are subjected to correction by respective gain units (23, 27) so as to be increased depending upon the rotational speed of the servo motor. Since a current loop gain is increased depending upon the rotational speed of the servo motor, the oscillation of the current loop does not occur at the time of low speed drive and stop, and the shortage of torque due to the lowering of the current loop gain at the time of high speed drive can be prevented.

5 Claims, 4 Drawing Sheets

4,956,593

SERVO MOTOR CONTROLLING METHOD

BACKGROUND OF THE INVENTION

The present invention relates to a servo motor controlling method for controlling the rotational speed and the current of servo motor under a digital control. More particularly, the present invention is directed to a servo motor controlling method in which the gain of a current control loop is changed dependent upon the rotational speed of the servo motor.

Due to improved performance of microprocessors and the reduced cost thereof, a digital controlling method for a servo motor has been extensively employed as a servo motor controlling method. In FIG. 4, there is shown a block diagram illustrating a servo motor controlling method performed under digital control. An operation unit 1 outputs a difference between a speed instruction VCMD and a speed feedback signal fb. An integrator 2 has a speed loop integration gain of $k_{1v}$. An operation unit 3 outputs a current instruction value which is divided into three for three phases of a servo motor. Each of the divided values is fed to R, S and T phases. Since the arrangement of each of the phases is identical, only the R phase is shown in the figure and the remaining phases are omitted therein. Designated by numeral 4 is a speed loop proportional gain.

Denoted by reference numeral 10 is an R phase current controlling loop. An operation unit 11 outputs a difference between an R phase feedback current Ir and the current instruction. An integrator 12 has a current loop integration gain of $k_1$. An operation unit 13 outputs a difference between the output of the integrator 12 and a current loop proportional gain $k_2$ designated by reference numeral 14. An operation unit 15 outputs a difference between a counter electromotive voltage E(S) of the servo motor and the output of the operation unit 13 13. A first order delay element 16 includes a winding resistance R of the servo motor and an inductance L thereof. The output of the first-order delay element 16 is a current in the servo motor.

A torque constant $K_t$ is designated by reference numeral 17 and its output is a torque. A motor 18 imposes an inertia Jm which is an integrator in terms of a numerical equation. The output of the motor 18 defines the rotational speed of the servo motor and outputs a speed feedback signal fb.

In such a servo motor controlling method performed under digital control, however, a period of time required for the software processing of the digital control is not negligible when the servo motor has reached a high speed rotational state. The delay of the processing time causes a lower current loop gain. Further, the electromotive force of the servo motor becomes high and the current loop gain is brought to a decreased status. For these reasons. the high speed rotations cannot be attained and a storage of torque results In contrast, the constant rising of the current loop gain causes oscillation of the current loop to occur at the time when the motor is rotating at a low speed or is stopped.

SUMMARY OF THE INVENTION

An object of the invention is to resolve the aforementioned problems and to provide a servo motor controlling method in which the gain of a current control loop is changed dependent upon the rotational speed of the servo motor.

According to the present invention, in order to solve the above-mentioned problems, there is provided a servo motor controlling method for controlling both speed and current of a servo motor under digital control. The method includes providing a current controlling loop in a speed loop and controlling an integration gain and a loop proportional gain of the current controlling loop so as to be changed depending upon the speed of the servo motor.

Since the current loop gain is increased depending upon the speed of the servo motor, the oscillation in the current loop does not occur at the time of low speed drive and stop, and the shortage of torque due to the lowering of the current loop gain at the time of high speed drive can be prevented.

DESCRIPTION OF THE PREFERRED EMBODIMENT

An embodiment of the present invention will be described with reference to the accompanying drawings.

Figure 1:
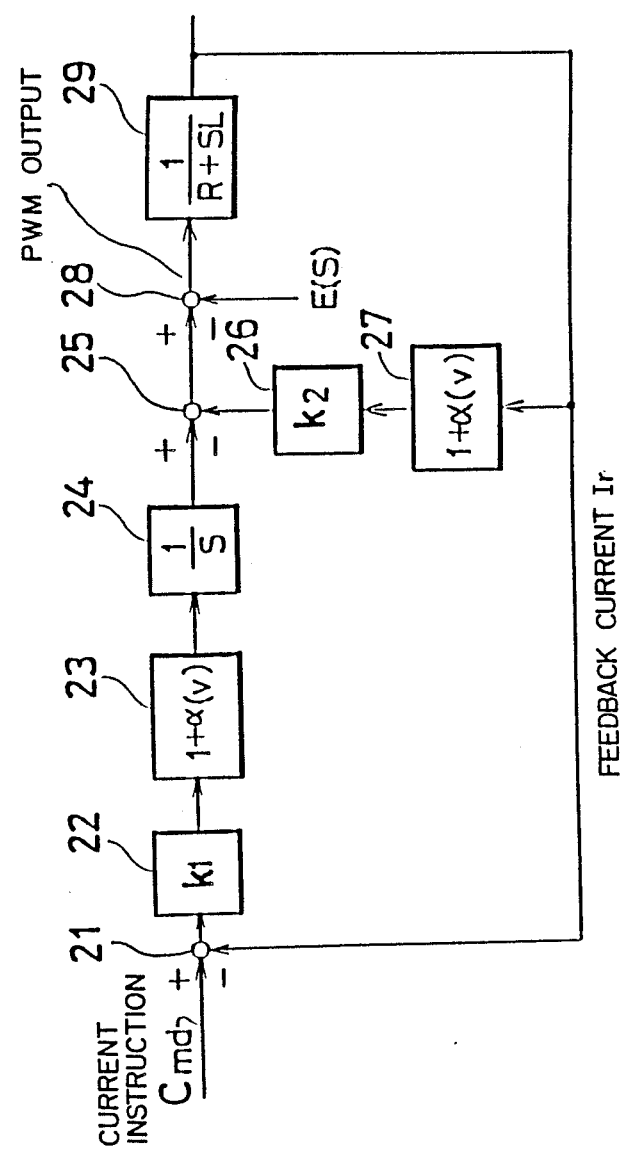
FIG. 1 is a block diagram of one phase of a current control loop according to one embodiment of the present invention.
Figure 4:
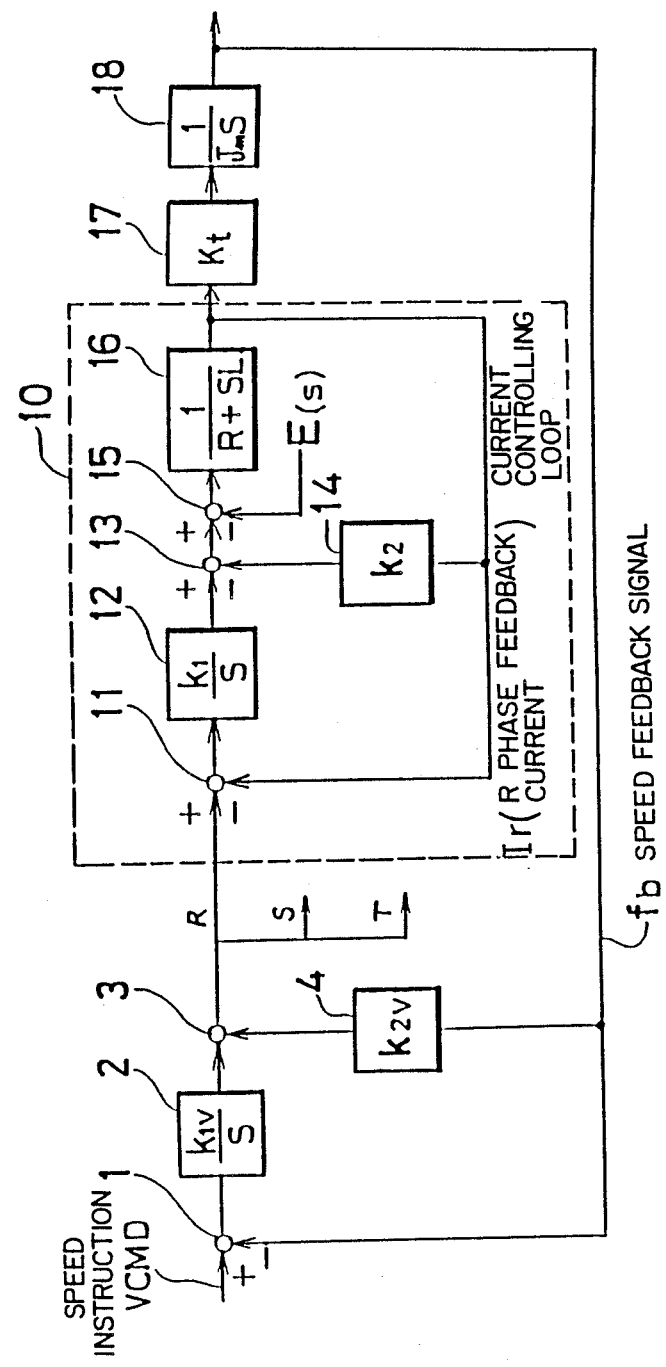
FIG. 4 is a block diagram of a conventional servo motor controlling system under digital control.

FIG. 1 is a block diagram of a current controlling loop for one phase according to one embodiment of the invention. A speed loop is the same as the one shown in FIG. 4, and thus a description thereof is omitted herein. In FIG. 1, an operation unit 21 outputs a difference between the current instruction Cmd of an R phase and a feedback current Ir. A current loop integration gain unit 22 has a value of k1. A gain unit 23 has a value of $1+\alpha(v)$ and is provided for correcting the current loop integration gain. A detailed description of the gain unit 23 will be given later on. Designated by reference numeral 24 is an integrator whose output is a voltage.

Designated by numeral 25 is an operation unit designated at 26 is a current loop proportional gain unit having a value of k2 and designated at 27 is a gain for correcting the current loop proportional gain unit having the same value as that of the gain 23 for correcting the current loop integration gain. The operation unit 25 outputs a difference between the output of the integrator 24 and the output of the current loop proportional gain unit 26. An operation unit 28 outputs a difference between the output of the operation unit 25 and the counter electromotive voltage E(S) of the servo motor. The output of the operation unit 28 is applied as a PWM output to a PWM controlling circuit in the servo motor which controls a servo motor to determine a pulse width. The servo motor is designated by numeral 29, which shows a first-order delay element in terms of a numerical equation in which R is a winding resistance of the servo motor and L is an inductance. The output from the inductance is a current in the servo motor.

In this manner, by the correction of both the current loop integration gain (k1) unit 22 and the current loop proportional gain (k2) unit 26 by correcting gains "$1+\alpha(v)$", the resultant current loop integration gain and the current loop proportional gain can be changed depending upon the rotational speed of the servo motor 29. Hence, the shortage of torque at the time of high speed rotations and the increment of a speed deflection amount can be prevented.

Figure 2:
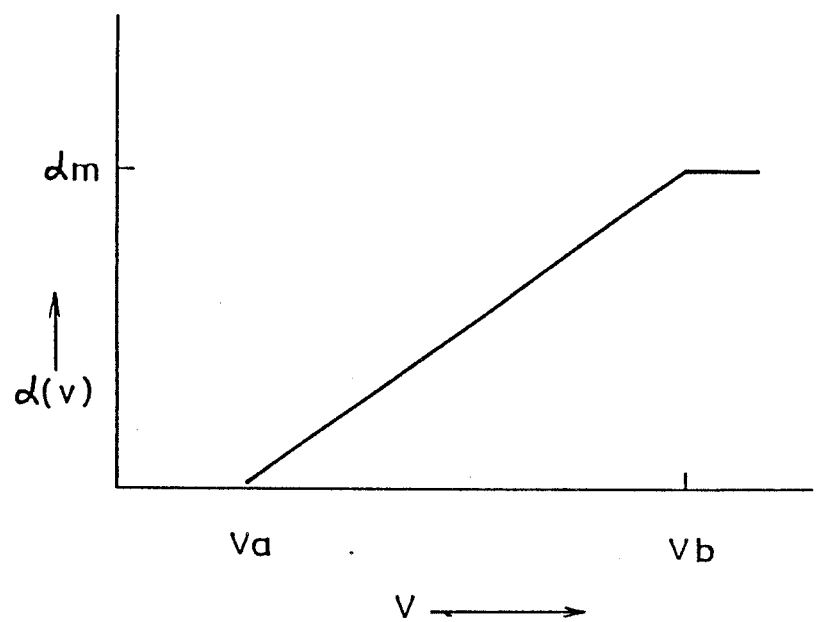
FIG. 2 is a graph showing one example of a function of (v)

Next, an example of a function α(v) will be described. One example of the function α(v) is shown in FIG. 2 in which the axis of the abscissa represents the rotational speed of the servo motor and the axis of the ordinate represents the value of the function α(v). When the speed is between 0 and va, the value of α(v) is zero, and when the speed is between va and vb, the value thereof increases linearly as the speed increases. When the speed exceeds vb, the value thereof is clamped at a fixed value αm.

Here, the value of α(m) is in the range from approximately 2 to 2.5, the value of va is approximately 500 r.p.m. and the value of vb is approximately 3,000 r.p.m. It goes without saying that these values are given by way of an example and are variable depending upon the output of the servo motor and the rated number of revolutions, etc.

Figure 3:
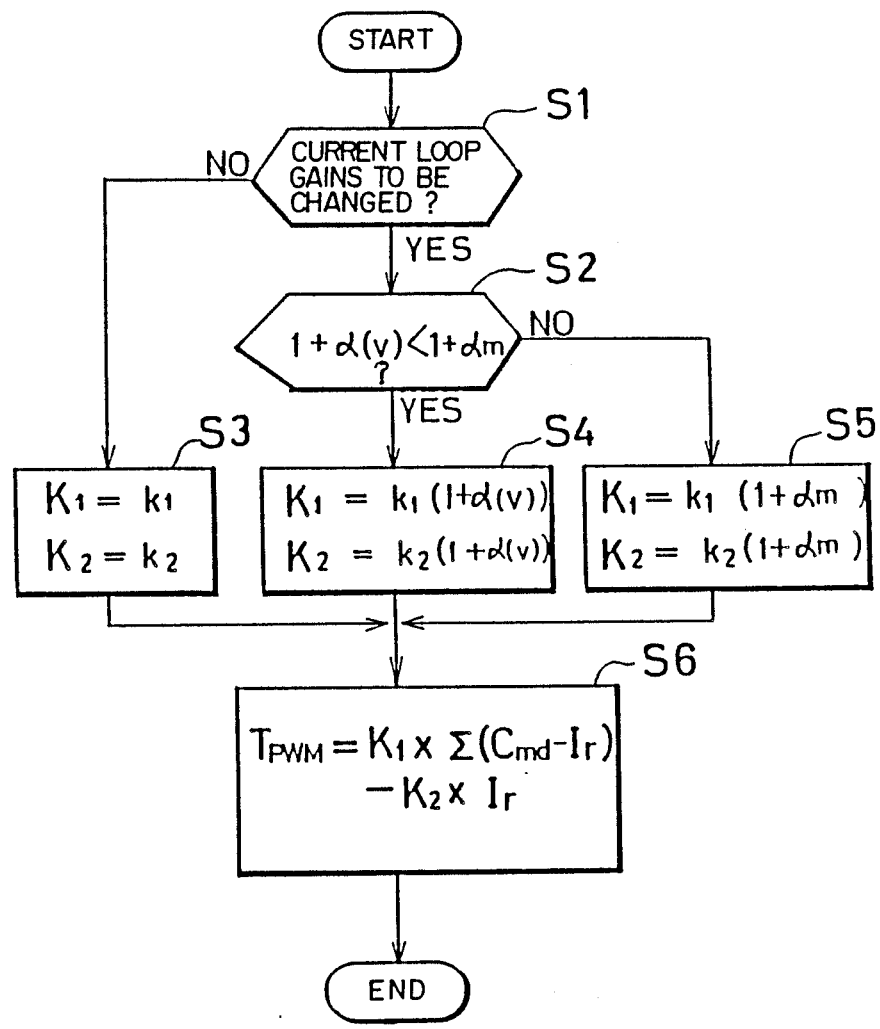
FIG. 3 is a flowchart of software processing according to one embodiment of the present invention.

The control of the current control loop is implemented by a microprocessor. An outline of this software processing is shown in FIG. 3, in which the numerals following the character S represent step numbers. Various characters are defined as follows.

$K_1$: Current loop integration gain (after correction)
$K_2$: Current loop proportional gain (after correction)
$k_1$: Current loop integration gain (before correction)
$k_2$: Current loop proportional gain (before correction)
$T_{PWM}$: Pulse width from the PWM circuit (S1) A decision is made as to whether or not the current loop gains (current loop integration gain and the current loop proportional gain) are to be changed. Normally, the changes of these current loop gains are set by parameters. If the current loop gains are not changed, the procedure advances to S3; whereas if they are changed, the procedure advances to S2.

(S2) A decision is made as to whether or not the rotational speed of the servo motor is below the value that the function α(v) is to be clamped. If a decision made in this step indicates that the speed of the servo motor is below that value, the procedure advances to S4; whereas if it is not below that value, the procedure advances to S5.

(S3) Since the current loop gain is not changed, the current loop integration gain and the current loop proportional gain, before correction, are used as they are.
(S4) The current loop gain is corrected as described hereinbefore.

$$K_1 = k_1(1 + \alpha(v))$$

$$K_2 = k_2(1 + \alpha(v))$$

(S5) The current loop gain is changed. However, since the rotational speed of the servo motor has reached the clamping region in the function α(v), it is corrected by the clamp value "1+αm".
(S6) In accordance with the current loop gains obtained in steps S3, S4 and S5, the pulse width $T_{PWM}$ of the PWM circuit is computed and output.

In the above description, although the correction function of the current loop gain is made to be linearly increasing as the speed of the servo motor increases, it is possible to employ other functions which vary along other curves depending upon the characteristics of the servo motor.

As described, according to the present invention, the current loop gain increases depending upon the rotational speed of the servo motor. This prevents shortage of torque and increment of the speed deflection amount due to the lowering of the current loop gain at the time of high speed drive without causing the oscillation in the current loop to occur at the time of low speed drive and stop.

We claim:
1. A servo motor controlling method for controlling both speed and current of a servomotor under digital control, and having a current controlling loop in a speed loop, comprising the steps of:
 (a) sensing the speed of the servo motor; and
 (b) controlling an integration gain and a loop proportional gain of the current controlling loop, the integration gain and the proportional gain being changed depending upon the speed of the servo motor.

2. A servo motor controlling method according to claim 1, wherein said step (b) of controlling the integration gain and proportional gain includes linearly increasing the integration gain and proportional gain with respect to a rotational speed of the servo motor.

3. A servo motor controlling method for controlling a speed and current of a servo motor under digital control, comprising the steps of:
 (a) determining whether current loop gains are to be changed;
 (b) deciding, when the current loop gains are to be changed, whether a rotational speed of the servo motor is below a clamping value;
 (c) correcting the current loop gain in accordance with said step (b);
 (d) changing the current loop gain when the rotational speed of the servo motor is not below the clamping value; and
 (e) computing and outputting a pulse width in accordance with the current loop gain.

4. A servo motor controller, comprising:
 a speed loop generating a current command; and
 a current loop, within the speed loop, for receiving the current command from said speed loop, said current loop, comprising:
  first operation means, operatively connected to receive the current command and a feedback current from the servo motor, for outputting a difference between the current command and feedback current;
  current loop integration gain means for receiving the difference from said first operation means and outputting a gain;
  first gain means for receiving the gain from said current loop integration means and outputting a signal;
  integration means for receiving the signal output from said first gain means for outputting a voltage;
  second gain means for receiving the feedback current from the servo motor and outputting a correction signal;
  current loop proportional gain means for receiving the correction signal and outputting a corrected current loop proportional gain;
  second operation means, connected to said integration and said current loop proportional gain means, for outputting a difference between the voltage output from said integration means and the corrected current loop proportional gain; and third operation means for receiving a counter electromotive voltage and the difference output from said second operation means and for outputting, to the servo motor, a difference signal corresponding to the difference between the counter electromotive voltage and the difference output.

5. A current controlling loop according to claim 4, wherein the gain of said current loop integration gain means and the gain of said current loop proportional gain means have the same value.

* * * * *

UNITED STATES PATENT AND TRADEMARK OFFICE
CERTIFICATE OF CORRECTION

PATENT NO. : 4,956,593

DATED : SEPTEMBER 11, 1990

INVENTOR(S) : KEIJI SAKAMOTO ET AL.

It is certified that error appears in the above-identified patent and that said Letters Patent is hereby corrected as shown below:

Col. 3, first equation, "=" should be --$\alpha$--.

Signed and Sealed this

Tenth Day of December, 1991

Attest:

HARRY F. MANBECK, JR.

*Attesting Officer* — Commissioner of Patents and Trademarks